(12) United States Patent
Levring (10) Patent No.: US 9,036,998 B2
(45) Date of Patent: May 19, 2015

(54) LONG-HAUL UNDERSEA TRANSMISSION SYSTEM AND FIBER

(71) Applicant: OFS Fitel, LLC, Norcross, GA (US)

(72) Inventor: Ole A Levring, Virum (DK)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 13/968,601

(22) Filed: Aug. 16, 2013

(65) Prior Publication Data

US 2014/0050481 A1 Feb. 20, 2014

Related U.S. Application Data (60) Provisional application No. 61/684,742, filed on Aug. 18, 2012.

(51) Int. Cl.
| | |
|---|---|
| *H04B 10/12* | (2006.01) |
| *G02B 6/02* | (2006.01) |
| *H04B 10/2507* | (2013.01) |
| *H04B 10/2525* | (2013.01) |
| *G02B 6/036* | (2006.01) |

(52) U.S. Cl.
CPC .......... *G02B 6/0228* (2013.01); *H04B 10/2507* (2013.01); *G02B 6/03666* (2013.01); *H04B 10/25253* (2013.01)

(58) Field of Classification Search
CPC ............ H04B 10/2513; H04B 10/25133; H04B 10/2525; H04B 10/25253

USPC ............ 398/147, 158, 159, 148, 79, 81, 104; 385/123, 124, 127, 24, 27, 31, 15, 125, 385/122

See application file for complete search history.

(56) References Cited

U.S. PATENT DOCUMENTS

| | | | |
|---|---|---|---|
| 6,307,985 B1 * | 10/2001 | Murakami et al. | 385/24 |
| 6,473,550 B1 * | 10/2002 | Onishi et al. | 385/123 |
| 6,782,172 B2 * | 8/2004 | Hirano et al. | 385/123 |
| 8,494,368 B2 * | 7/2013 | Xie et al. | 398/81 |
| 2011/0318019 A1 * | 12/2011 | Nissov et al. | 398/159 |

* cited by examiner

*Primary Examiner* — Hanh Phan
(74) *Attorney, Agent, or Firm* — Jacobs & Kim LLP (57) ABSTRACT

An undersea long-haul transmission system includes an optical fiber transmission span and a coherent detection and digital signal processing module for providing dispersion compensation. The transmission span includes at least one fiber pair comprising substantially equal lengths of a positive-dispersion first fiber and a negative-dispersion second fiber that are configured to provide a signal output at transmission distances greater than 10,000 km, in which the combined accumulated dispersion across the operating bandwidth does not exceed the dispersion-compensating capacity of the coherent detection and digital signal processing module. Further described is a fiber for use in an undersea long-haul transmission span. At a transmission wavelength of 1550 nm, the fiber has a dispersion coefficient in the range of −16 to −25 ps/nm·km, and a dispersion slope in the range of 0.04 to 0.02 ps/nm²·km.

8 Claims, 7 Drawing Sheets

| Fiber Properties (@1550 nm) | Units | Low | High | Average |
|---|---|---|---|---|
| Dispersion | ps/nm·km | -16.0 | -25.0 | -20.5 |
| Dispersion Slope | ps/nm$^2$·km | 0.04 | 0.02 | 0.03 |
| Effective Area | μm$^2$ | 45.0 | 70.0 | 57.5 |
| Loss | dB/km | 0.200 | 0.215 | 0.208 |

LONG-HAUL UNDERSEA TRANSMISSION SYSTEM AND FIBER

CROSS REFERENCE TO RELATED APPLICATIONS

The present application claims the priority benefit of U.S. Provisional Patent Application Ser. No. 61/684,742, filed on Aug. 18, 2012, which is owned by the assignee of the present application, and which is incorporated herein by reference in its entirety.

BACKGROUND OF THE INVENTION

1. Field of the Invention

This invention relates to improved optical systems and fibers, and in particular to optical systems and fibers that are specially adapted for long-haul undersea optical transmission.

2. Background Art

There is an ongoing demand for undersea long-haul optical transmission spans with increased lengths and data transmission rates. In order to achieve these objectives, the optical properties of the transmission components must be configured to achieve acceptably low levels of attenuation (i.e., transmission loss) and splice loss, while also maintaining acceptably low levels of dispersion and non-linearities.

Typical undersea long-haul transmission spans therefore commonly employ lengths of a negative-dispersion non-zero dispersion fiber (NZDF) combined with lengths of a dispersion compensating fiber (DCF) to control the amount of accumulated dispersion over the transmission span. An undersea optical fiber transmission span according to the prior art may include other components for providing amplification, as well as dispersion slope management.

The design of these transmission spans is complex because a number of conflicting considerations must be taken into account. For example, certain designs may call for the use of specialty fibers that provide management of both accumulated dispersion and dispersion slope. However, such fibers typically have relatively small effective areas, with increased attenuation and splice loss. In addition, such fibers are also typically difficult to design and costly to manufacture.

It should further be noted that because of the highly competitive nature of the fiber optics industry, there is an ongoing effort to reduce costs. An undersea transmission system can have a length of 10,000 km or more. Thus, even an apparently modest reduction in manufacturing and installation expenses can have a significant impact on the overall cost of a long-haul system.

SUMMARY OF THE INVENTION

An aspect of the invention is directed to an undersea long-haul transmission system comprising an optical fiber transmission span and a coherent detection and digital signal processing module at the span output for providing dispersion compensation to a transmitted optical signal. The optical fiber transmission span includes at least one fiber pair comprising substantially equal lengths of a positive-dispersion first fiber and a negative-dispersion second fiber. The first and second fibers are configured to provide a signal output at transmission distances greater than 10,000 km, in which the combined accumulated dispersion across the operating bandwidth does not exceed the dispersion-compensating capacity of the coherent detection and digital signal processing module.

A further aspect of the invention is directed to an optical fiber for use in an undersea long-haul transmission span. The fiber comprises a core and a plurality of cladding layers that are configured such that, at a transmission wavelength of 1550 nm, the fiber has a dispersion coefficient in the range of −16 to −25 ps/nm·km, and a dispersion slope in the range of 0.04 to 0.02 ps/nm²·km.

DETAILED DESCRIPTION

Figure 1:
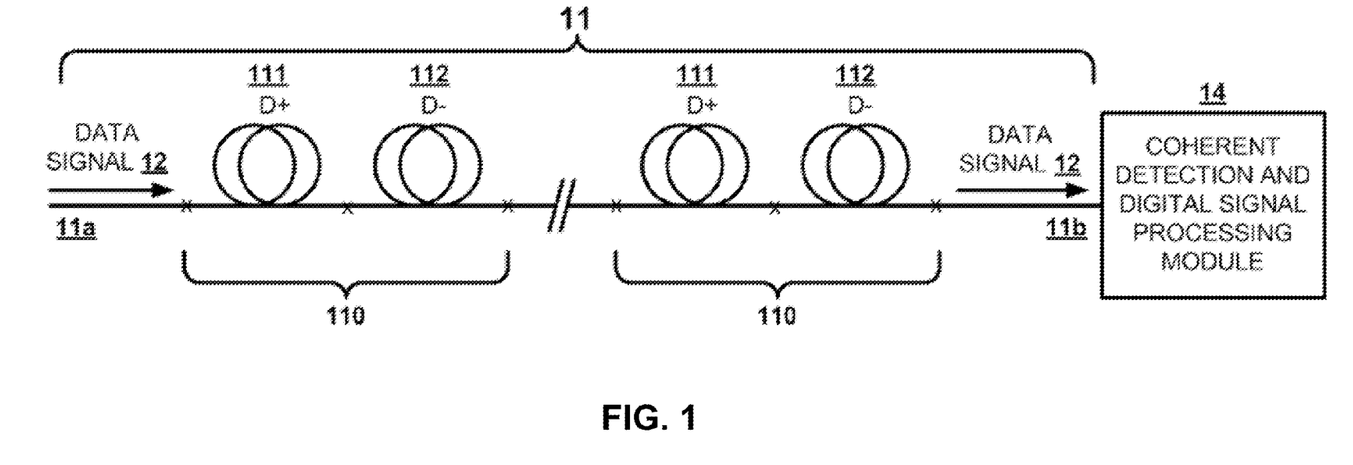
FIG. 1 shows a diagram of an undersea long-haul transmission system according to an aspect of the invention.

FIG. 1 shows a diagram of a long-haul undersea optical transmission system 10 according to an aspect of the invention. System 10 comprises a transmission span 11 that provides a transmission pathway between an input end 11a and an output end 11b for an optical data signal 12 comprising a series of pulses of coherent light. The span's output end 11b is connected to a coherent detector and digital signal processing module 14, which provides dispersion compensation for the transmitted data signal 12.

Transmission span 11 comprises at least one fiber pair 110 including a length of a first transmission fiber 111 having a positive dispersion (D+) and a length of a second transmission fiber 112 having a negative dispersion (D−). As discussed below, the first and second fibers are configured such that the dispersion of the transmitted data signal 12 falls within the maximum dispersion-compensating capacity of module 14. As further discussed below, the first and second fibers are configured such that the optical fiber pair 110 includes substantially equal lengths of the first and second fibers. Finally, the positive and negative dispersion values D+ and D− must be chosen, such that the dispersion of the combined fiber span is larger or smaller than the minimal residual span dispersion in the full transmission band.

Generally speaking, an undersea long-haul transmission (LHT) system has high bandwidth and distance requirements. An LHT system employing dense wavelength division multiplexing (DWDM) operates within the C-band (1530 nm to 1565 nm), utilizing signal light wavelengths in the 30 nm bandwidth range extending from 1535 nm to 1565 nm (i.e., 1550 nm±15 nm). As discussed below, in order to meet the demands of current applications, an undersea LHT system should be able to operate at transmission distances on the order of 10,000 km, including distances up to 15,000 km.

The issue of dispersion is an important consideration in the design of an undersea LHT system. Dispersion can be characterized as a temporal distortion (i.e., "spreading") of data pulses that results when different components of a light signal travel through a transmission span at different speeds. Differences in speed may result, for example, when components of a light signal have different wavelengths or states of polarization. Generally speaking, in a positive dispersion fiber, the amount of total dispersion increases linearly as a function of the length of the fiber. Thus, in a DWDM fiber span having a length of 10,000 km or more, effective dispersion management is critical.

As mentioned above, in system 10, a coherent detection and digital signal processing (DSP) module 14 is used to provide dispersion compensation. There are a number of advantages for performing at least some of the required dispersion compensation in the digital domain, particularly in an undersea LHT system. One advantage is that digital signal processing preserves the full information of the incoming field. Thus, a DSP-based system is able to achieve high receiver sensitivity and spectral efficiency, and allows the use of advanced modulation formats.

With respect to transmission loss (also referred to as "attenuation") and splice loss, the optimum fiber solution for an undersea LHT system employing DSP would be a large-effective-area, low-loss fiber. However, currently available fibers of this type have dispersion properties that, in conjunction with the dispersion compensation capacity of currently available DSP integrated circuits, limit the overall length of the transmission span. These fibers typically have dispersion values in the range of 15 to 22 ps/nm·km, at a transmission wavelength of 1550 nm. In current fiber spans for submarine transmission, span dispersion is kept low, i.e., at values in the range of approximately 0 to −2 ps/nm·km.

The DSP integrated circuits that are currently available for 40 GBit/sec and 100 GBit/sec transmissions are limited to numerical dispersion compensation of approximately ±30,000 ps/nm. Thus, assuming the transmission span has a dispersion value in the range of 15 to 22 ps/nm·km, the span has a maximum length on the order of approximately 1,500 km. By current submarine LHT standards, this span length is fairly short. As mentioned above, in order to meet current demands, an LHT system should be able to provide error-free transmission at span lengths on the order of 10,000 km or greater, including spans with lengths of 15,000 km.

It is possible that, in the future, DSP integrated circuits may be able to handle larger total span dispersion values. However, the development of a new DSP design is costly and complex. In addition, it appears such integrated circuits would be significantly more expensive than currently available products and would consume significantly more power. Therefore, for the purposes of the present discussion, it is assumed that for the foreseeable future the practical maximum DSP capacity will remain at, or close to, 30,000 ps/nm.

In addition to varying with length, dispersion also typically varies with wavelength. Thus, a second issue that must be addressed is the slope of the dispersion function, i.e., the "steepness" of the relationship between dispersion and wavelength. Dispersion slope has to be taken into account in order to make sure that dispersion is properly managed across the entire desired operating bandwidth. If needed, dispersion slope management can be provided by a specialty dispersion-compensating fiber (DCF). However, in addition to being relatively expensive to design and manufacture, these fibers have small effective areas, leading to increased transmission loss and splice loss. Thus, it is desirable to design an LHT system that does not require the use of these specialty fibers.

In LHT system 10, assuming that the link has a length of 15,000 km, the average accumulated dispersion per kilometer must fall within the range of ~±2.0 ps/nm·km, across the operating bandwidth. As mentioned above, submarine transmissions use a 30 nm bandwidth, ranging from 1535 nm to 1565 nm (i.e., 1550 nm±15 nm).

Figure 2:
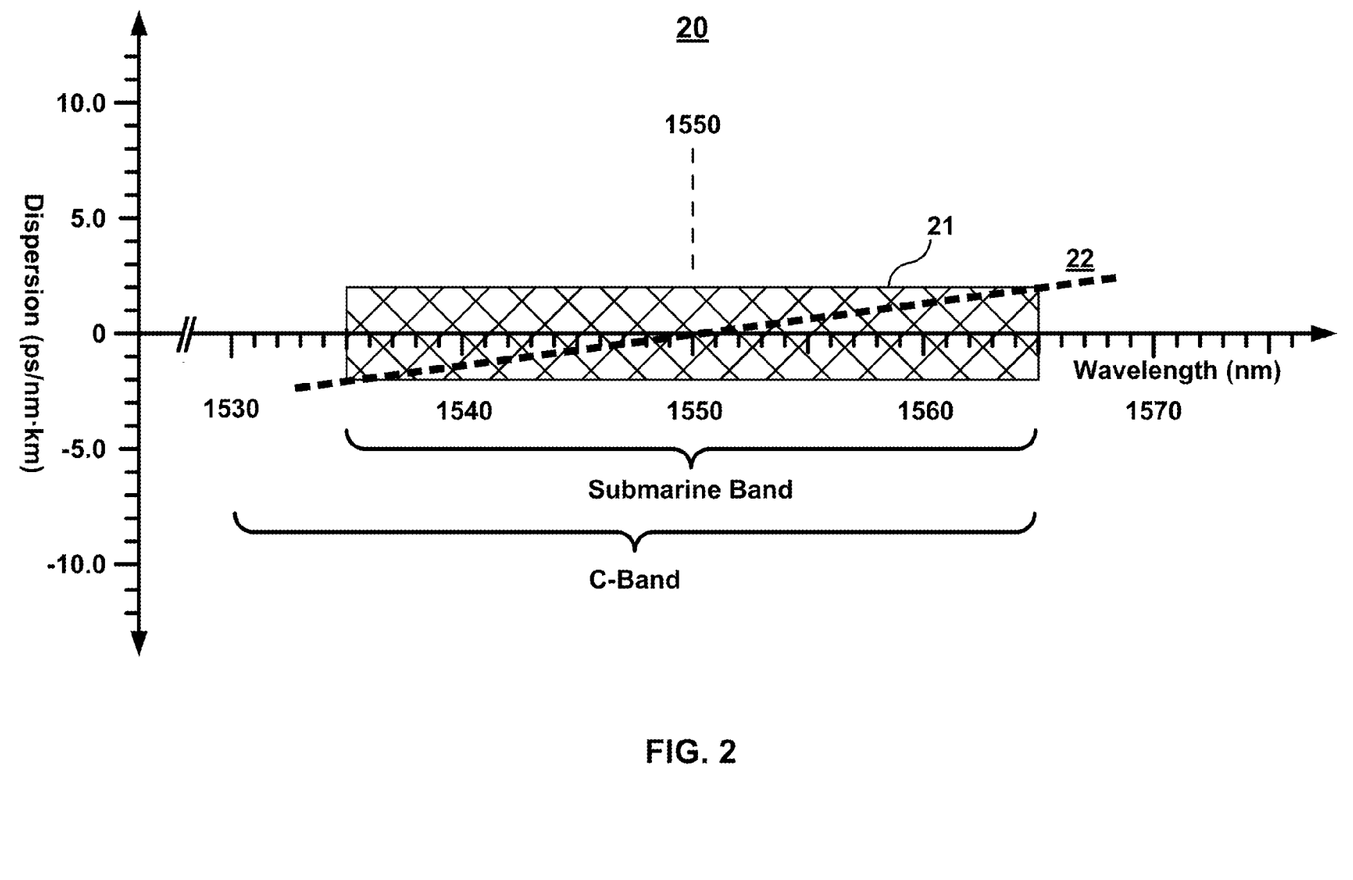
FIG. 2 shows a graph illustrating the required average dispersion and dispersion slope properties for the FIG. 1 transmission span.

FIG. 2 shows a graph 20 illustrating the required average dispersion and dispersion slope properties for the FIG. 1 transmission span 11, assuming a span length of 15,000 km. In FIG. 2, the x-axis represents transmission wavelength (nm), and the y-axis represents dispersion (ps/nm·km). Cross-hatched box 21 is bounded at its left and right sides by the upper and lower wavelengths of the operating bandwidth, 1535 nm and 1565 nm, and is bounded at its upper and lower sides by the range of dispersions processible by the DSP integrated circuit, i.e., ~±2.0 ps/nm·km.

Thus, box 21 represents the boundaries of the average combined dispersion of the first and second fibers. In order to not exceed the maximum dispersion compensation capacity of the DSP integrated circuit, the average combined dispersion function of the first and second fibers must fall between the upper and lower sides of box 21 in the bandwidth defined by the box's left and right sides.

The maximum average combined dispersion slope over the operating bandwidth is represented by the slope of a broken diagonal line 22 extending from one corner of box 21 to the opposite corner. Thus, in the present example, the maximum average combined dispersion slope is ~0.13 ps/nm²·km (i.e., the dispersion, ±2.0 ps/nm·km, divided by the bandwidth 30 nm).

Thus, in the system 10 shown in FIG. 1, the respective dispersion properties and lengths of the first and second fibers 111 and 112 are configured such that, assuming a span length of 15,000 km, the transmitted signal 12 has a combined dispersion, throughout the 1535-1565 nm operating bandwidth, that falls within the dispersion-compensating capacity of the DSP integrated circuit, i.e., ~30,000 ps/nm·km. First and second fibers 111 and 112 are further configured to have a relatively large effective area, low attenuation, and loss splice loss.

Some currently available positive dispersion (D+) fibers, such as OFS UltraWave fiber, appear at first glance to be suitable for constructing a long-haul system satisfying the above criteria. However, the optimization of these solutions is subject to the constraint of matching dispersion and dispersion slope compensation over the transmission band. This constraint significantly limits the effective area of the negative dispersion (D−) fiber.

There are no currently available pairs of fibers that satisfy the above criteria. Accordingly, an aspect of the invention provides a specially designed negative-dispersion DCF that is suitable for use in conjunction with currently available positive-dispersion undersea transmission fibers to achieve the desired combined dispersion properties. The chromatic dispersion coefficient of the negative-dispersion DCF is matched to that of the positive-dispersion transmission fiber, so that the required span dispersion can be produced by a substantially symmetric span (i.e., a span with substantially equal lengths of positive-dispersion and negative-dispersion fibers).

The reason that the span is not perfectly symmetric is that the respective dispersion functions of the two fibers will typically not be perfectly complementary. It will therefore typically be necessary to adjust the relative lengths of the two fibers to achieve the desired combined total dispersion. As used herein, the term "substantially" includes both an approximation of an ideal case and the ideal case itself. Thus, for example, the term "substantially equal span" refers to both a span in which the component fibers have approximately equal lengths, and a span in which the component fibers have exactly equal lengths.

Thus, the ratio of the respective lengths of the positive-dispersion fiber 111 and the negative-dispersion fiber 112 is 1:1 or close to 1:1. This ratio allows the use of relatively long lengths of the positive-dispersion coefficient fiber 111. A standard single-mode fiber (SSMF) is an example of a fiber that is suitable for use as the positive-dispersion first fiber 111. Typically, an SSMF has a positive dispersion coefficient of at least 16 ps/nm·km.

The transmission fiber 111 and the DCF 112 have dispersion properties such that the output of the long-haul transmission link is processable by a suitable DSP component without the need for dispersion slope management. Because no dispersion slope management is required, each of the transmission fiber and the DCF can be configured to have a large effective area and low attenuation, without compromising the processability of the transmission link output by the DSP component.

In one practice of the invention, the positive-dispersion first fiber 111 comprises a single-mode fiber suitable for long-haul undersea applications, and having a dispersion coefficient in the range of and a chromatic dispersion slope in the range of 0.05-0.07 ps/nm$^2$·km, at a transmission wavelength of 1550 nm. Examples of such fibers include Ultra-Wave SLA and TeraWave ULA, which are manufactured and sold by OFS Fitel, LLC, the assignee of the present application.

Figure 3:
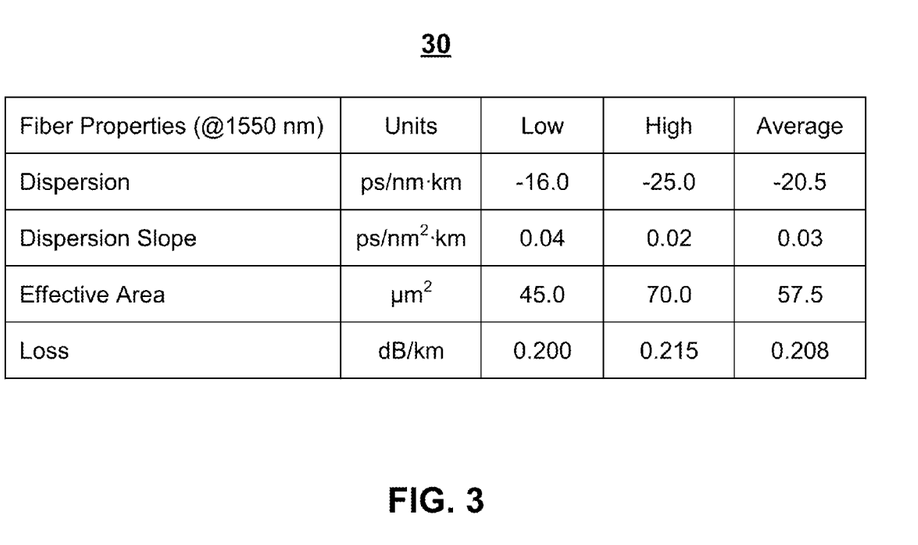
FIG. 3 shows a table setting forth the properties of a dispersion-compensating fiber according to a further aspect of the invention.

FIG. 3 shows a table 30 setting forth the properties of the new fiber at a transmission wavelength of 1550 nm. The new fiber has a chromatic dispersion coefficient in the range of −16 to −25 ps/nm·km, with an average value of −20.5 ps/nm·km; and a chromatic dispersion slope in the range of 0.04 to 0.02 ps/nm$^2$·km, with an average value of 0.03 ps/nm$^2$·km. The effective area of the new fiber is in the range of 45 to 70 μm$^2$, with an average value of 57.5 μm$^2$. The loss of the new fiber is in the range of 0.200 to 0.215 dB/km, with an average value of 0.2075 dB/km.

Figure 4:
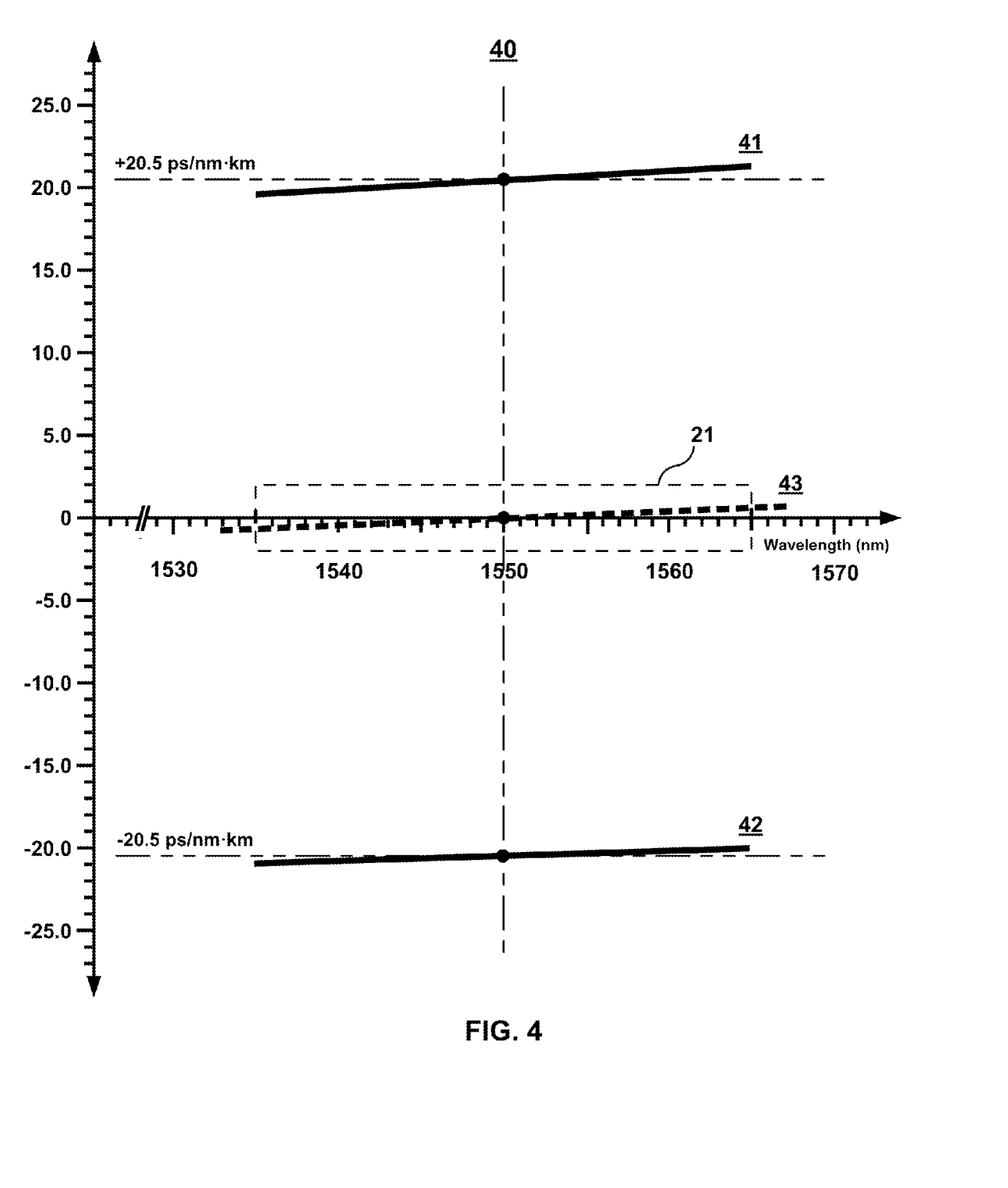
FIG. 4 shows a graph illustrating the dispersion functions for the first and second fibers of the FIG. 1 system, and their combined average dispersion function.

FIG. 4 shows a graph 40 illustrating the dispersion functions for the first fiber (line 41) and second fiber (line 42), and their combined average dispersion function (broken line 43). For the purposes of the present discussion, the three dispersion functions 41, 42, and 43 are drawn as straight lines, based upon their average values. However, it will be appreciated that the present discussion also applies to a transmission system in which different lengths fibers having non-linear (i.e., curved) dispersion functions.

Graph 40 shows how the respective dispersions and dispersion slopes of the first and second fibers combine into a non-zero residual dispersion over the transmission band. In graph 40, it has been assumed that the first and second fibers have exactly complementary dispersion properties, and that the span therefore comprises equal lengths of the first and second fibers. As discussed above, where the first and second fibers have dispersion properties that do not exactly match each other, it will typically be necessary to adjust the relative lengths of the first and second fibers to achieve the desired total combined output dispersion. In that case, in computing the average combined dispersion slope, one would have to take into account the differing amounts of the two fibers used.

In graph 40, the first fiber dispersion function is illustrated by line 41, which at 1550 nm shows a positive dispersion coefficient of 20.5 ps/nm·km. Assuming a constant positive dispersion slope of 0.06 ps/nm$^2$·km, the dispersion coefficient ranges from 19.6 ps/nm·km at 1535 nm to 21.4 ps/nm-km at 1565 nm.

The second fiber dispersion function is illustrated by line 41, which at 1550 nm shows a negative dispersion coefficient of −20.5 ps/nm·km. Assuming that the fiber has a constant positive dispersion slope of 0.03 ps/nm$^2$·km, the fiber has a dispersion coefficient that ranges from −20.95 ps/nm·km (at 1535 nm) to −20.05 ps/nm·km (at 1565 nm).

The combined average dispersion function is illustrated by broken line 43, which at 1550 nm shows a zero dispersion coefficient. The average dispersion slope is 0.045 ps/nm$^2$·km. Thus, the combined average dispersion coefficient ranges from −0.0675 ps/n·km at 1535 nm to 0.0675 ps/nm·km at 1565 nm. For the purposes of comparison, broken lines have been used to draw into graph 40 the outline of box 21 from FIG. 2. It will be seen that the combined average dispersion falls well within the required boundaries.

Figure 5:
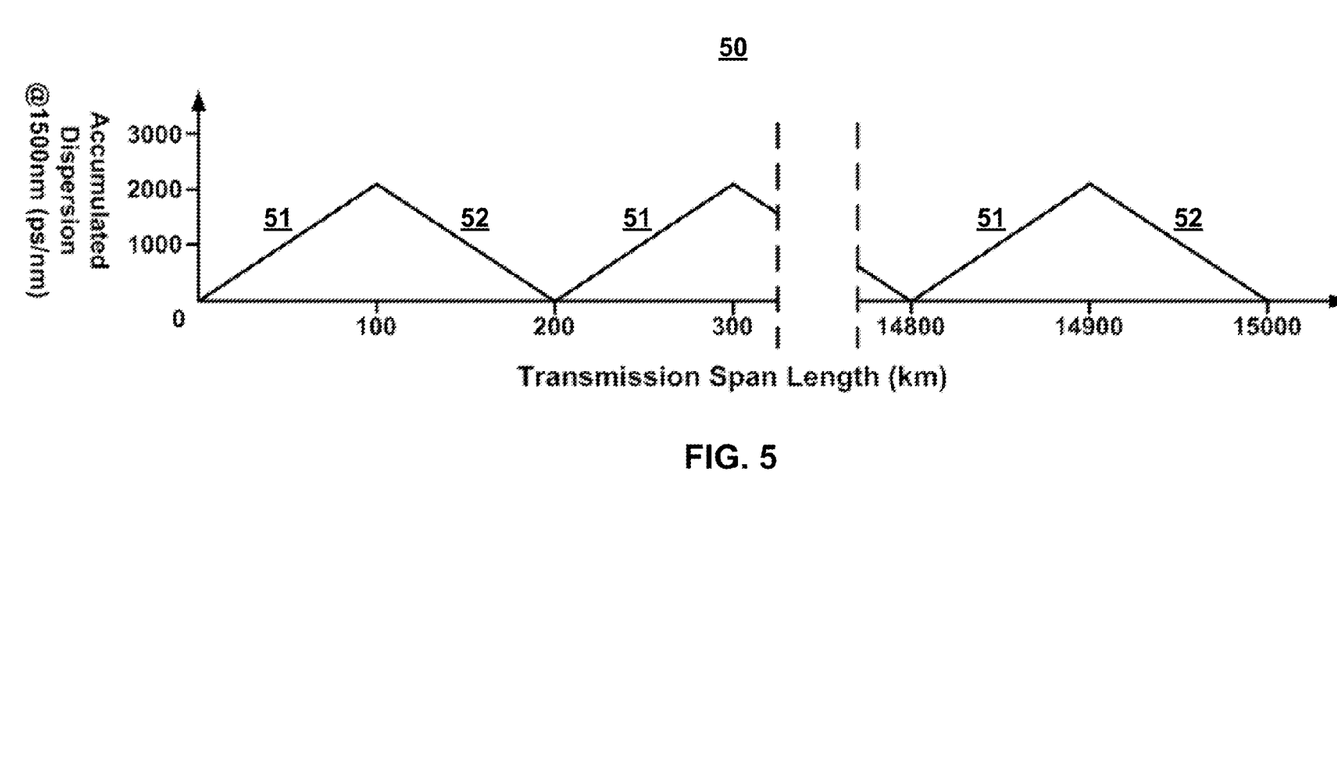
FIG. 5 shows a graph illustrating the accumulated dispersion in a 15,000 km transmission span comprising 100 km lengths of the first and second fibers in the FIG. 1 system.

FIG. 5 shows a graph 50 illustrating the accumulated dispersion in a 15,000 km transmission span comprising 100 km lengths of the first and second fibers. For the purposes of illustration, the first and second fibers are assumed to have exactly complementary dispersion properties, and that there is a perfectly linear relationship between fiber length and accumulated dispersion.

As shown by upwardly sloping line segments 51, assuming that the first fiber has a positive dispersion coefficient of 20.5 ps/nm·km at 1550 nm, each 100 km segment of the first fiber introduces accumulated dispersion of 2,050 ps/nm at 1550 nm. As shown by downwardly sloping line segments 52, assuming that the second fiber has a negative dispersion coefficient of −20.5 ps/nm·km at 1550 nm, each 100 km segment of the first fiber reduces accumulated dispersion by 2,050 ps/nm at 1550 nm. Thus, each 200 km pair of first and second fibers has zero accumulated dispersion at 1550 nm. A 15,000 km transmission span uses 75 such pairs of the first and second fibers.

However, as discussed above, the first and second fibers have a non-zero combined dispersion slope. Thus, although graph 50 shows zero accumulated dispersion at 1550 nm at a transmission distance of 15,000 km, there will be accumulated dispersion at other wavelengths within the 1535 nm-1565 nm bandwidth. Assuming that the combined average dispersion slope of the two fibers is 0.045 ps/nm$^2$·km, that means that the expected range of dispersion values across the operating bandwidth at the span output will be approximately ±10,000 ps/nm, and will therefore be processible by a currently available DSP integrated circuit.

Figure 6:
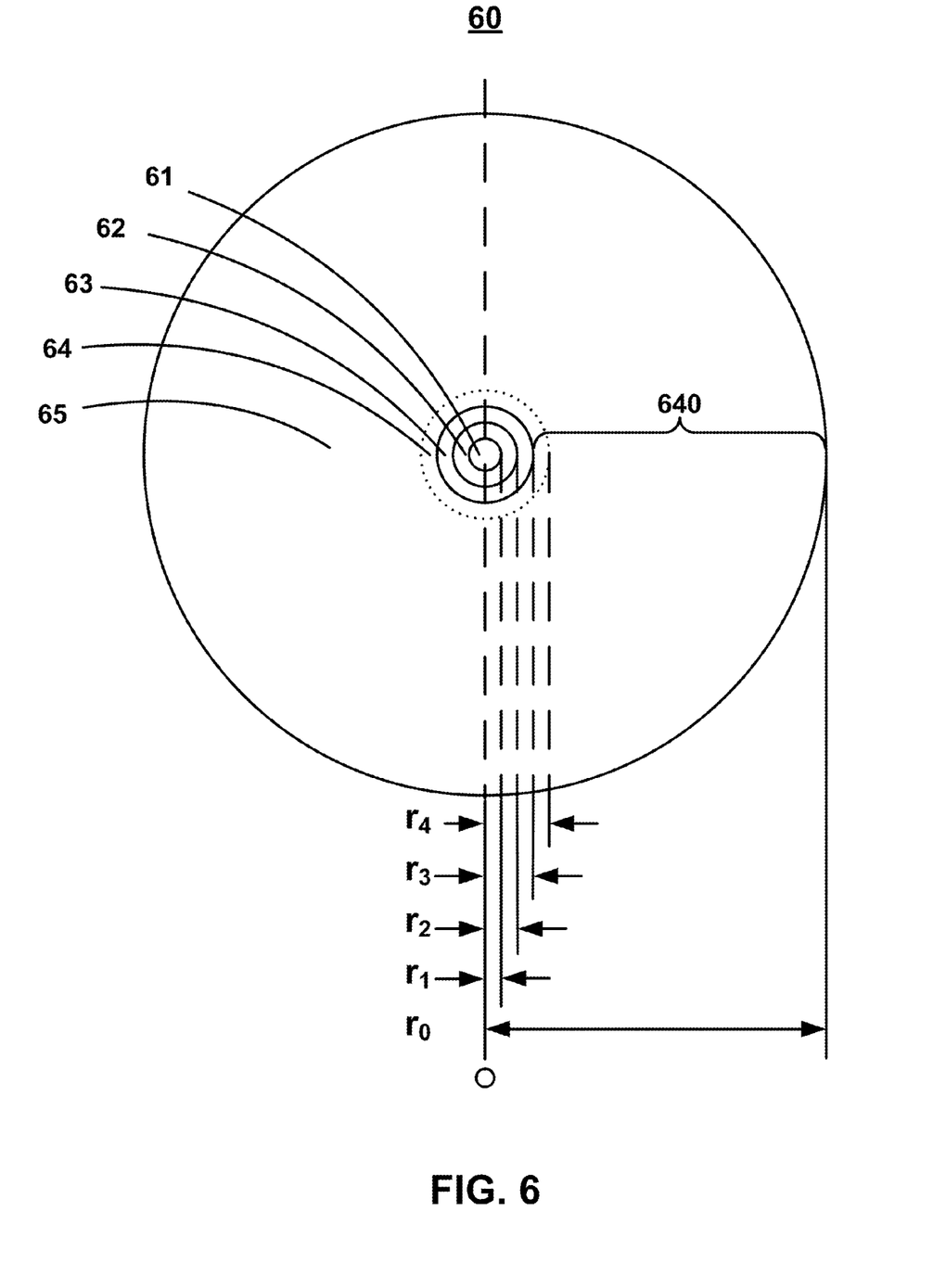
FIG. 6 shows a cross section of a dispersion-compensating according to an aspect of the invention.

FIG. 6 shows a cross section view (not drawn to scale) of an exemplary DCF design 60, according to a further aspect of the invention, having the above-described dispersion properties. Fiber 60 is fabricated from silica, or other suitable material, and includes a core 61 and a plurality of cladding layers 62-65 surrounding the core. The core and cladding layers are created through the use of index-raising and index-lowering chemical dopants that are added to the fiber material. The depicted fiber can be manufactured using a modified chemical vapor deposition (MCVD), or the like.

Figure 7:
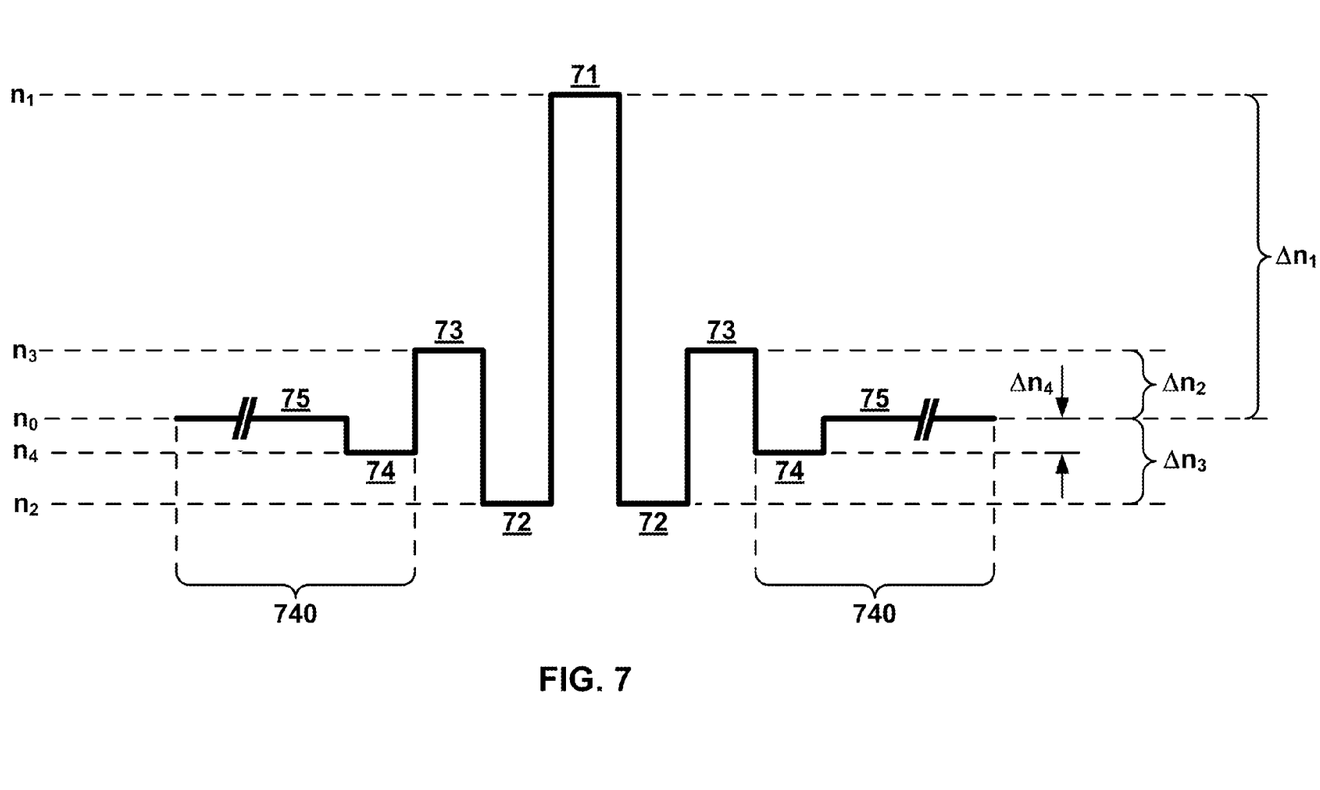
FIG. 7 shows a refractive index profile for the fiber shown in FIG. 6.

FIG. 7 shows an exemplary refractive index profile 70 for fiber 60. In refractive index profile 70, the x-axis represents a diameter extending across the fiber, with index values 71-75 corresponding to fiber regions 61-65. The refractive index values 71-75 are configured to create a plurality of waveguides extending down the length of the fiber 60.

According to a practice of the invention, the outermost cladding layer 65 is fabricated from undoped silica. The refractive index $n_0$ of the outer cladding 65 is used as a baseline reference value that is subtracted from each of the respective refractive indices $n_1$–$n_4$ of the other fiber regions to produce a respective index difference $\Delta n_1$–$\Delta n_4$ for each fiber region.

As shown in FIGS. 6 and 7, fiber 60 includes the following regions:

1. Core region 61/71 is located at the center of fiber 60, and has a radius $r_1$, a refractive index $n_1$, and an index difference $\Delta n_1 = n_1 - n_0$. Core region 61/71 is provided by silica that has been up-doped with germanium, or other suitable index-raising chemical, to produce a relatively large $\Delta n_1$, resulting in a central spike 71 in the refractive index profile 70.

2. An annular "inner trench" region 62/72 surrounds core region 61/71, and has an inner radius $r_1$, an outer radius $r_2$, a refractive index $n_2$, and an index difference $\Delta n_2 = n_2 - n_0$. Trench region 62/72 is formed from silica that has been down-doped with fluorine or other index-lowering chemical, to produce a refractive index $n_2$ that is lower than that of the outer cladding $n_0$ (i.e., $\Delta n_2$ is negative).

3. An annular "ring" region 63/73 surrounds trench region 62/72, and has an inner radius $r_2$, an outer radius $r_3$, a refractive index $n_3$, and an index difference $\Delta n_3 = n_3 - n_0$. Trench region 63/73 is formed from silica that has been up-doped with fluorine, or other index-raising chemical, to produce a refractive index that is higher than that of the outer cladding (i.e., $\Delta n_3$ is positive).

4. An annular "outer trench" region 64/74 surrounds ring region 63/73, and has an inner radius $r_3$, an outer radius $r_4$, a refractive index $n_4$, and an index difference $\Delta n_4 = n_4 - n_0$. Trench region 64/74 is formed from silica that has been down-doped with fluorine or other index-lowering chemical, to produce a refractive index $n_4$ that is slightly lower than that of the outer cladding $n_0$ (i.e., $\Delta n_4$ is negative).

5. Outer cladding 65/75 surrounds outer trench region 64/74, and has an inner radius $r_4$, an outer radius $r_0$, a refractive index $n_0$, and a refractive index difference $\Delta n_0 = n_0 - n_0 = 0$.

The design of fiber 60 is generally referred to herein as a "modified triple-clad design," wherein the core is surrounded by a trench cladding layer 62, a ring cladding layer 63, and a compound third cladding 640 (i.e., shallow outer trench 64 and outer cladding 65). This type of design may also be referred to as a "quadruple-clad design." It will be appreciated that it would be possible to practice the claimed invention with other types of designs, including for example a design wherein the third cladding 640 is fabricated entirely from undoped silica (i.e., wherein the fiber does not include outer trench 64).

As noted above, in the present example, fiber 60 is formed from silica using germanium and fluorine as index-raising and index-lowering dopants. However, it will be appreciated that the described invention may be practiced using other suitable materials or dopants, or combinations thereof. Further, although refractive index profile 60 shows a "step" profile in which each fiber region has the same refractive index across its width, in actual practice there will be variations in the respective fiber regions, particularly proximate to the boundaries between adjoining regions. In addition, it will be further appreciated that the described invention may be practiced with a design including a graduated index profile.

In addition to those already mentioned, another optical fiber property of interest is polarization mode dispersion (PMD). PMD within acceptable limits for state-of-the-art cables is typical in optical fibers with properties and refractive index profiles just discussed. A useful specification for PMD in these optical fibers is 0.04 ps/km$^{1/2}$, or less.

The DCF described above is designed for undersea transmission cable applications, particularly those using paired lengths of positive and negative dispersion coefficient fiber. However, it should be understood that other applications may be found for optical fiber having these unique transmission properties.

Conclusion

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

I claim:

1. An optical fiber for use in an undersea long-haul transmission span, comprising:
   a core; and
   a plurality of cladding layers surrounding the core,
   wherein the core and cladding layers are configured such that the fiber has, at a transmission wavelength of 1500 nm, a dispersion coefficient in the range of −16 to −25 ps/nm·km, and a dispersion slope in the range of 0.04 to 0.02 ps/nm$^2$·km, at a transmission wavelength of 1550 nm,
   wherein the core has a radius $r_1$, a refractive index $n_1$ greater than a reference refractive index $n_0$, and a positive index difference $\Delta n_1 = n_1 - n_0$; and
   wherein the plurality of cladding layers includes:
   an annular inner trench surrounding the core, the inner trench having an inner radius $r_1$, an outer radius $r_2$, a refractive index $n_2$ less than $n_0$, and a negative index difference $\Delta n_2 = n_2 - n_0$;
   an annular ring surrounding the inner trench, the ring having an inner radius $r_2$, an outer radius $r_3$, a refractive index $n_3$ greater than $n_0$, and a positive index difference $\Delta n_3 = n_3 - n_0$; and
   a third cladding region surrounding the ring, the third cladding region having an inner radius $r_3$ and an outer radius $r_0$, and wherein at least a portion of the third cladding region includes a region having a refractive index $n_0$, and refractive index difference $\Delta n_0 = n_0 - n_0 = 0$.

2. The fiber of claim 1, further including:
   an outer trench surrounding the ring,
   wherein the outer trench comprises an inner portion of the third cladding region, the outer trench having an inner radius $r_3$, an outer radius $r_4$, a refractive index $n_4$ less than $n_0$, and a negative refractive index difference $\Delta n_0 = n_4 - n_0$.

3. The fiber of claim 2,
   wherein the portion of the third cladding region having a refractive index $n_0$ is undoped silica.

4. The fiber of claim 3,
   wherein the core and ring are each doped with an index-raising chemical, and wherein the inner trench and outer trench are each doped with an index-lower chemical.

5. The fiber of claim 4,
   wherein the index-raising chemical is germanium, and the index-lower chemical is fluorine.

6. The optical fiber of claim 1,
   wherein the fiber has an effective area in the range of 45 to 70 μm$^2$.

7. The optical fiber of claim 6,
   wherein the fiber has an attenuation in the range of 0.200 to 0.215 dB/km.

8. The optical fiber of claim 7, wherein the fiber has a polarization mode dispersion of 0.04 ps/km$^{1/2}$, or less.

\* \* \* \* \*